United States Patent
Shaw et al.

(10) Patent No.: US 10,051,199 B2
(45) Date of Patent: Aug. 14, 2018

(54) APPARATUS AND METHOD FOR PRECISION IMMOBILIZATION OF MULTIPLE CAMERAS IN A MULTI-CAMERA SYSTEM

(71) Applicant: Dell Products, LP, Round Rock, TX (US)

(72) Inventors: Timothy C. Shaw, Austin, TX (US); Christopher A. Torres, San Marcos, TX (US); Deeder M. Aurongzeb, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 14/806,158

(22) Filed: Jul. 22, 2015

(65) Prior Publication Data

US 2017/0026585 A1    Jan. 26, 2017

(51) Int. Cl.
*H04N 5/247* (2006.01)
*H04N 5/225* (2006.01)
*G03B 17/56* (2006.01)
*H04N 5/232* (2006.01)

(52) U.S. Cl.
CPC .......... *H04N 5/247* (2013.01); *G03B 17/561* (2013.01); *H04N 5/2251* (2013.01); *H04N 5/2252* (2013.01); *H04N 5/2257* (2013.01); *H04N 5/2258* (2013.01); *H04N 5/23293* (2013.01)

(58) Field of Classification Search
CPC .. H04N 5/247; H04N 5/2251; H04N 5/23293; H04N 1/024; H04N 1/02463; H04N 5/2258; H04N 5/2257; H04N 5/2252; G03B 17/561
See application file for complete search history.

(56) References Cited

U.S. PATENT DOCUMENTS

| | | | |
|---|---|---|---|
| 4,976,802 A * | 12/1990 | LeBlanc | H01L 25/042 156/273.5 |
| 6,338,543 B1 * | 1/2002 | Lindenfelser | B41J 2/2135 347/20 |
| 9,479,758 B2 * | 10/2016 | Woo | H04N 13/0239 |
| 2005/0046740 A1 * | 3/2005 | Davis | H04N 5/2254 348/373 |
| 2007/0109439 A1 * | 5/2007 | Minamio | H01L 27/14623 348/340 |
| 2012/0086784 A1 * | 4/2012 | Oh | H04N 5/2251 348/47 |
| 2015/0035150 A1 * | 2/2015 | Li | H01L 23/481 257/747 |
| 2016/0295081 A1 * | 10/2016 | Graff | H04N 5/2254 |

* cited by examiner

*Primary Examiner* — Albert Cutler
(74) *Attorney, Agent, or Firm* — Prol Intellectual Property Law, PLLC; H. Kenneth Prol

(57) ABSTRACT

An information handling system includes a multi-camera mounting apparatus. The multi-camera mounting apparatus accommodates a plurality of camera modules in order to capture a three dimensional image. The multi-camera mounting apparatus is comprised of a uni-body bracket made of a combination of materials that have a near net-zero thermal expansion in order to maintain the cameras' locations relative to each other. Additionally, the camera modules may be affixed to the multi-camera mounting apparatus using UV-activated adhesive.

20 Claims, 5 Drawing Sheets

APPARATUS AND METHOD FOR PRECISION IMMOBILIZATION OF MULTIPLE CAMERAS IN A MULTI-CAMERA SYSTEM

FIELD OF THE DISCLOSURE

The present disclosure generally relates to an apparatus and method for immobilizing multiple cameras in a multi-camera system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

Information handling systems, such as tablet computers, can include a camera to take pictures, which in turn can be stored within the information handling system. The camera can be a digital camera that can include metadata associated with the image, and the metadata can include different information about the image.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
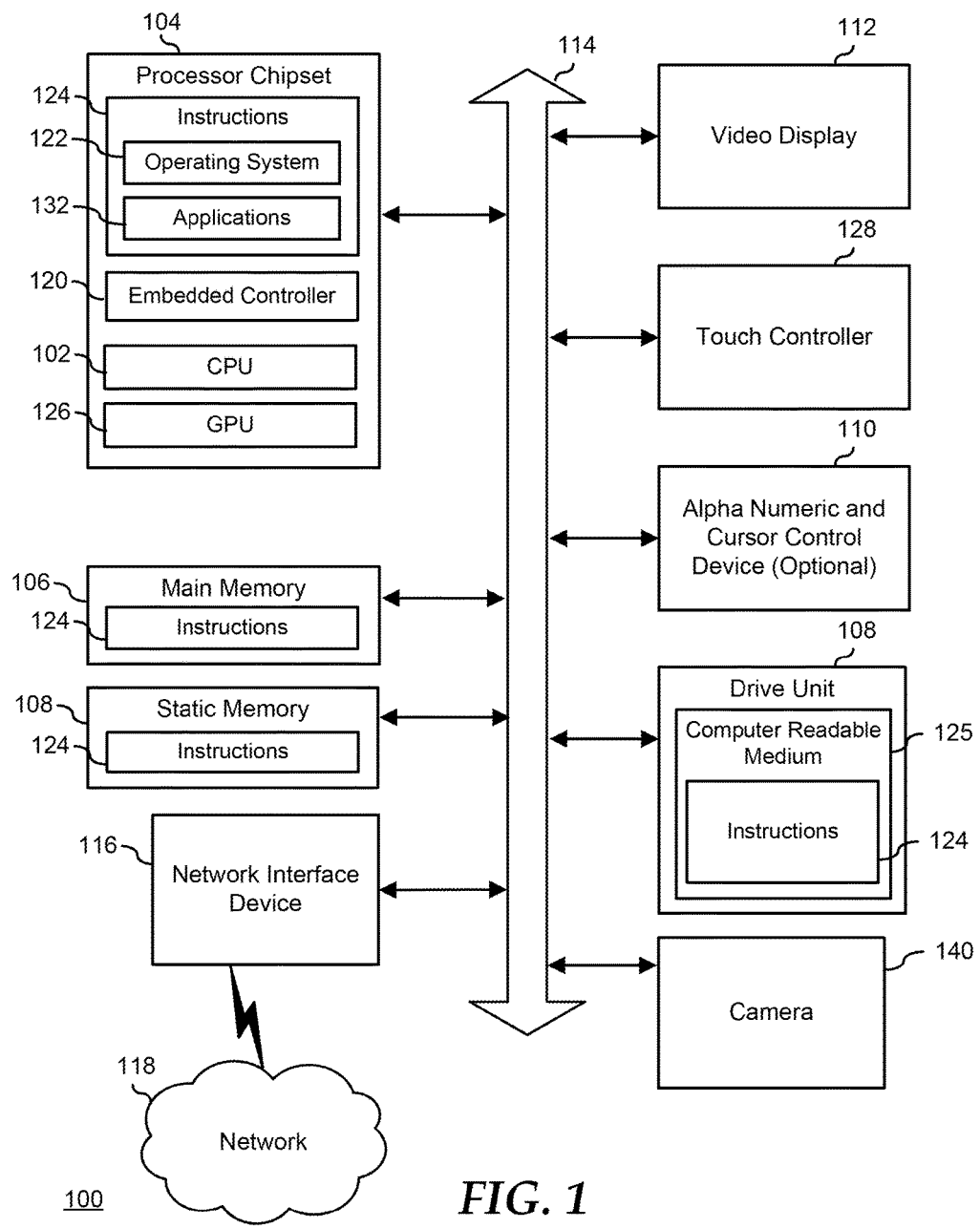
FIG. 1 is a block diagram of an information handling system.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

The information handling system can include a camera to capture images in the information handling system, such as a three-dimensional (3-D) camera, e.g., a stereo triangulation camera, a sheet of light triangulation camera, a structured light camera, a time-of-flight camera, an interferometry camera, a coded aperture camera, or any other type of 3-D camera known in the art. In an embodiment, the camera modules of the 3-D camera are mounted to a multi-camera mounting apparatus. The mounting-apparatus can have a uni-body bracket made of materials that reduce the net thermal expansion, including combined thermal expansion near net-zero. In an embodiment, there are multiple shapes that the uni-body bracket can have: bar, triangular, trapezoidal, rectangular, or the like. Further, the uni-body bracket can have pockets with glue channels so the camera modules of the 3-D camera can be affixed to the uni-body bracket with UV-activated adhesive (or UV glue). The camera modules can be permanently affixed to uni-body bracket by flashing the UV-activated adhesive.

FIG. 1 shows an information handling system 100 including conventional information handling systems components of a type typically found in client/server computing environments. The information handling system 100 may include memory, one or more processing resources such as a central processing unit (CPU) 102 and related chipset(s) 104 or hardware or software control logic. Additional components of system 100 may include main memory 106, one or more storage devices such as static memory or disk drives 108, an optional external input device 110 such as a keyboard, and a cursor control device such as a mouse, or a video display 112. The information handling system 100 may also include one or more buses 114 operable to transmit communications between the various hardware components.

More specifically, system 100 represents a mobile user/client device, such as a dual screen mobile tablet computer. System 100 has a network interface device 116, such as for a wireless cellular or mobile networks (CDMA, TDMA, etc.), WIFI, WLAN, LAN, or similar network connection, enabling a user to communicate via a wired or wireless communications network 118, such as the Internet. System 100 may be configured with conventional web browser software. The web browser, may include for example Microsoft Corporation's Internet Explorer web browser software, Firefox or similar such browsers to allow the user to interact with websites via the wireless communications network 118.

System 100 may include several sets of instructions 124 to be run by CPU 102 and any embedded controllers 120 on system 100. The instructions 124 can be stored in a computer readable medium 125 of a drive unit 108. One such set of instructions includes an operating system 122 with operating system interface. Example operating systems can include those used with typical mobile computing devices such as Windows Phone mobile OS from Microsoft Corporation and Android OS from Google Inc. Additional sets of instructions in the form of multiple software applications 124 may be run by system 100. These software applications 124 may enable multiple uses of the dual display information handling system as set forth in more detail below.

System 100 includes a display screen 112. The display screen 112 has a display driver operated by one or more graphics processing units (GPUs) 126 such as those that are part of the chipset 104. The display screen 112 also has an associated touch controller 128 to accept touch input on the touch interface of the display screen.

The display screen 112 may also be controlled by the embedded controller 120 of chipset 108. Each GPU 126 and display driver is responsible for rendering graphics such as software application windows and virtual tools such as virtual keyboards on the display 112. Control of the location and positioning of these windows may be set by user input to locate the screens or by control setting default. Windows may include other forms of display interface with software application besides a window. It is contemplated that tiles, thumbnails, and other visual application access and viewing methods via a display are contemplated to be considered windows. Virtual tools may include virtual keyboard, virtual touchpad or controller, virtual buttons and other input devices rendered via a display screen and accepting feedback via a touch control system.

In another example of display control via the disclosures herein, the power to the display screen 112 is controlled by an embedded controller 120 in the processor chipset(s) which manages a battery management unit (BMU) as part of a power management unit (PMU) in the BIOS/firmware of the main CPU processor chipset(s). These controls form a part of the power operating system. The PMU (and BMU) control power provision to the display screen and other components of the dual display information handling system.

System 100 of the current embodiment has a camera 140 to capture images in the information handling system 100. In an embodiment, the camera 140 can be a three-dimensional (3-D) camera, such that when the camera captures images (X,Y,Z) coordinates for each pixel of the image can be computed and stored. In another embodiment, the GPU 126, or other processor of the information handling system 100, can communicate with the camera 140 to receive the captured images and to calculate the distances for pixels in the newly captured images. The images and associated metadata can be stored in a memory of the information handling system 100, such as a flash memory, the static memory 108, the main memory 106, or the like.

In an embodiment, the camera 140 can be a multiview stereo camera that may include multiple apertures that can each capture the image from a different angle of view with respect to the other apertures of the camera. The different angles of view can cause a shift (parallax) in the (X,Y,Z) coordinates for each pixel in the image. For example, the pixel located at point 201, in FIG. 2, can have coordinates of $(X_1,Y_1,Z_1)$ when captured by a first aperture of the camera 140, can have the coordinates of $(X_2,Y_2,Z_2)$ when captured by a second aperture of the camera, and can have the coordinates of $(X_3,Y_3,Z_3)$ when captured by a third aperture of the camera. The difference, or parallax, between the coordinates from each of the apertures can be utilized to determine an absolute distance that the pixel at point 201 is from the camera 140, in physical units such as metric or imperial units. The calculation of the distance can be based on a calibration file that models the relationship(s) of the aperture(s), stored in a memory of the information handling system 100. In another embodiment, the camera 140 can use any other known method to assign distances to pixels in a 3-D image, such as sonar, radar, or the like, without varying from the scope of this disclosure. In an embodiment, the calibration file can be generated by acquiring multiple images of an object at multiple distances and angles to the camera 140. The calibration file can then model the relative offsets and transforms between the images at multiple distances, and once this relationship is understood, compute a physical dimension from a certain offset of pixels between images. In an aspect, the camera 140 can be a multiview stereo camera that may include multiple camera modules that can each capture images of the scene from a different angle of view with respect to the other camera modules.

In an embodiment, the display screen 112 can display an image selected by an individual such as an image previously captured by the camera 140. The GPU 126 can retrieve the image from memory, such as memory 108, and can provide the image to the display screen 112.

Figure 2:
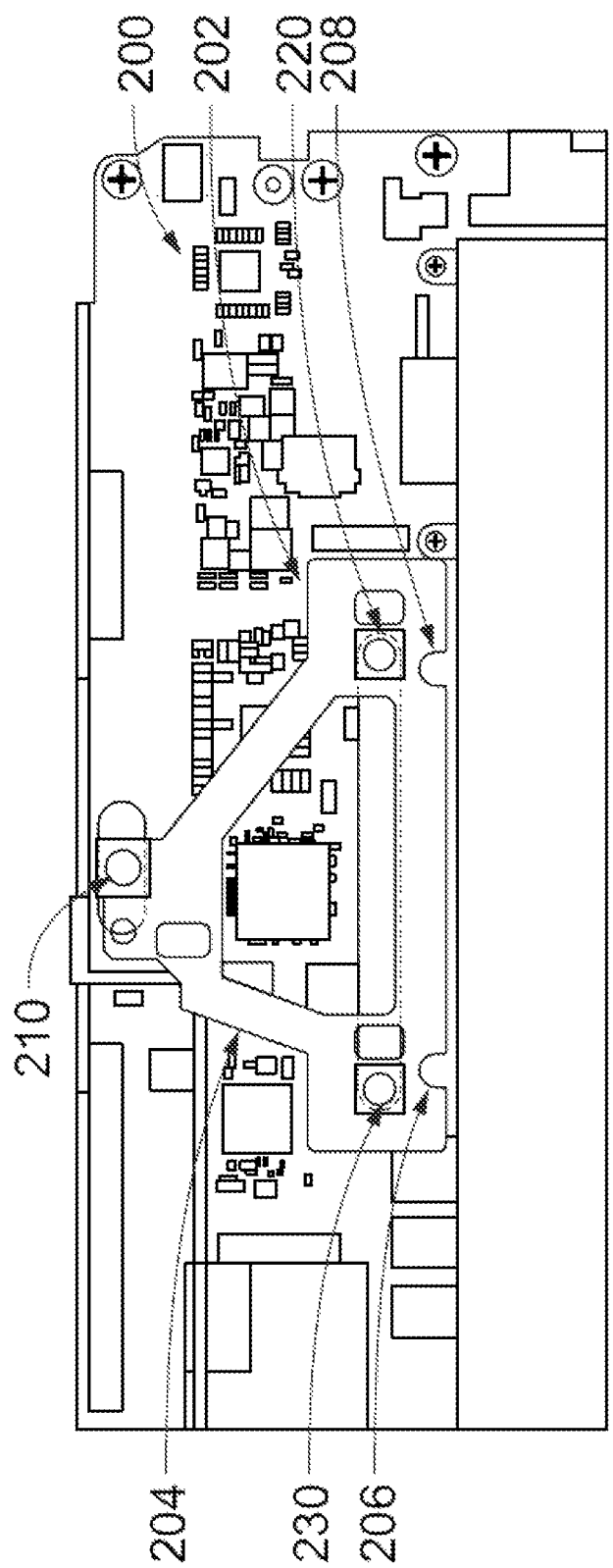
FIG. 2 is a schematic diagram of an information handling system with a multi-camera mounting apparatus according to a particular embodiment.

FIG. 2 illustrates an information handling system 200 including a multi-camera mounting apparatus 202. The multi-camera mounting apparatus 202 can be attached to the information handling system 200 via elastomeric isolation mounting interface, such as flexible mounts at attachment points 206 and 208. Exemplary materials that may be used for the elastomeric isolation mounting interface are silicone rubber, neoprene rubber, and open-cell foam rubber. Other materials with similar properties may be used as well. The elastomeric isolation mounting interface may allow for one or more of thermal expansion, vibration reduction, and bending of the multi-camera mounting apparatus 204. In an embodiment, the multi-camera mounting apparatus 202 has a uni-body bracket 204 that includes apertures 210, 220, and 230 for the lenses of the camera modules 140 of FIG. 1 to receive light from objects on the other side of the uni-body bracket 204.

Figure 3A:
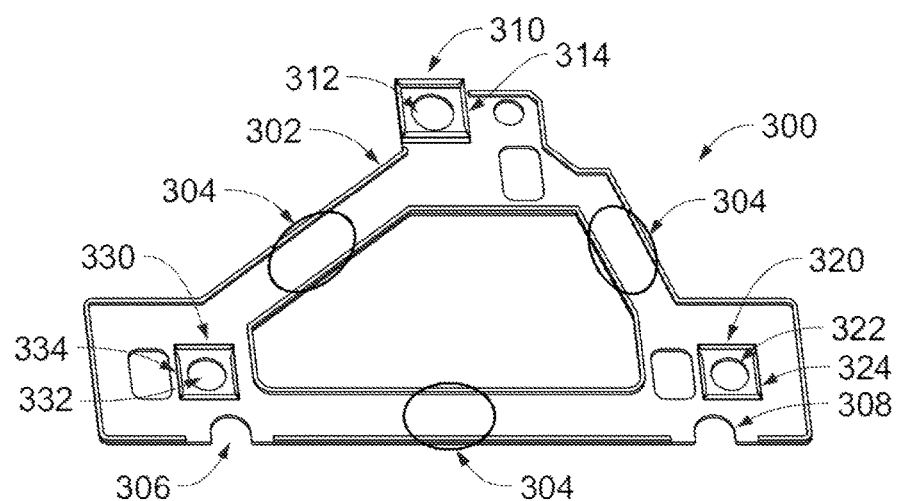
FIG. 3*a* is a schematic diagram of a multi-camera mounting apparatus according to a particular embodiment.
Figure 3B:
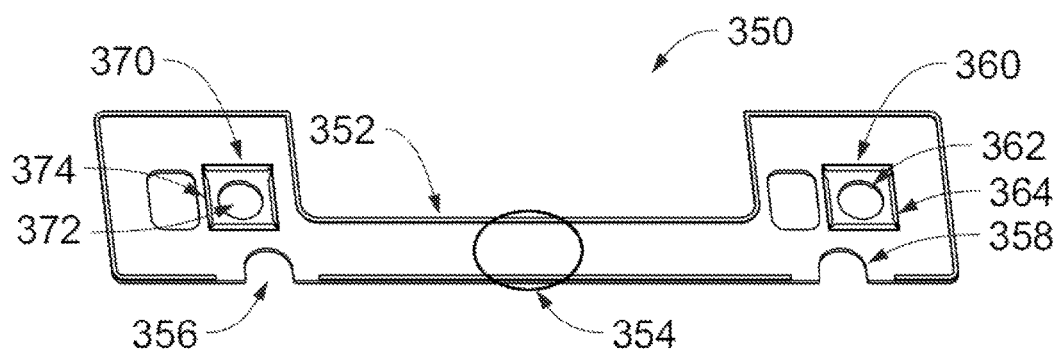
FIG. 3*b* is a schematic diagram of a multi-camera mounting apparatus according to a particular embodiment.

FIG. 3a illustrates a multi-camera mounting apparatus 300. In this embodiment, the multi-camera mounting apparatus 300 includes a uni-body bracket 302 with mounting zones 310, 320, and 330 for multiple camera modules 140, of FIG. 1. The uni-body bracket 302 may be formed in a variety of shapes to accommodate multiple camera modules 140, of FIG. 1, such as bar, triangular, square, rectangular, trapezoidal, etc. Further, though FIG. 3a shows mounting zones 310, 320, and 330 for three camera modules 140, of FIG. 1, in other embodiments, there can be any number of a plurality of camera modules 140. In such embodiments, the shape of the uni-body bracket may correspond to the number of camera modules 140 to be mounted. For example, as shown in the embodiment of FIG. 3b, a multi-camera mounting bar 350 can be used when two camera modules 140 are to be mounted. In an embodiment, the arms 304 of the uni-body bracket 302 is made of a first material and a second material where the coefficient of thermal expansion of the first material has the opposite sign of the coefficient of thermal expansion of the second material, which has the effect of reducing the net thermal expansion of the arms 304, and possibly reducing the net thermal expansion of the arms 304 to near zero. Examples of various arrangements of how the first material and the second material may be combined to form the arms 304 are shown in more detail below, in FIG. 4. In the particular embodiment of FIG. 3a, the mounting zones 310, 320, and 330 contain apertures 312, 322, and 332 and pockets with glue channels 314, 324, and 334. Each mounting zone, aperture, and pocket with glue channel combination is meant to allow the camera modules 140 to be bonded to the uni-body bracket 302. The apertures 312, 322, and 332 allow the lenses of the camera modules 140 to receive light from objects on the other side of the uni-body bracket 302 after the camera modules 140 are bonded to the uni-body bracket 302. The pockets with glue channels 314, 324, 334 allow for the camera modules 140 to be bonded to a greater surface area of the uni-body bracket 302 with UV-activated adhesive while allowing any excess UV-activated adhesive to escape from the pocket through the glue channels. In other embodiments, the mounting zones 310, 320, and 330 may not have pockets with glue channels. For example, the mounting zones 310, 320, and 330 may be raised off the surface of the uni-body bracket 302 such that they provide a platform for the multiple camera modules 140, of FIG. 1 to be bonded to the uni-body bracket 302. In an embodiment, the mounting zone may be raised off the surface of uni-body bracket 302 while one or more of the other mounting zones are not, and vice versa. Additionally, in some embodiments, one mounting zone may have pockets with glue channels while one or more of the other mounting zones do not, and vice versa. Other embodiments may include various combinations of the above. For example, in one embodiment, one mounting zone may be raised and not have a pocket with glue channels, a second mounting zone may not be raised and does not have a pocket with glue channels, and a third mounting zone may not be raised but does have a pocket with glue channels. Further, in the embodiment shown in FIG. 3, the uni-body bracket 302 has attachment points 306 and 308 for elastomerically mounting the multi-camera mounting apparatus 300 to the information handling system 200, of FIG. 2. In an embodiment, non-elastomeric mounting of the multi-camera mounting apparatus 300 may be done.

FIG. 3b illustrates a multi-camera mounting apparatus or multi-camera mounting bar 350. In this embodiment, the multi-camera mounting apparatus 350 includes a uni-body bracket 352 with mounting zones 360 and 370 for multiple camera modules 140, of FIG. 1. The uni-body bracket 352 may be formed in a variety of shapes to accommodate multiple camera modules 140, of FIG. 1, such as bar, triangular, square, rectangular, trapezoidal, etc. Further, though FIG. 3b shows mounting zones 360 and 370 for two camera modules 140, of FIG. 1, in other embodiments, there can be any number of a plurality of camera modules 140. In such embodiments, the shape of the uni-body bracket may correspond to the number of camera modules 140 to be mounted. For example, as shown in the embodiment of FIG. 3a, a multi-camera mounting in the shape of a trapezoid can be used when three camera modules 140 are to be mounted. In an embodiment, the arm 354 of the uni-body bracket 352 is made of a first material and a second material where the coefficient of thermal expansion of the first material has the opposite sign of the coefficient of thermal expansion of the second material, which has the effect of reducing the net thermal expansion of the arms 354, and possibly reducing the net thermal expansion of the arms 354 to near zero. Examples of various arrangements of how the first material and the second material may be combined to form the arms 354 are shown in more detail below, in FIG. 4. In the particular embodiment of FIG. 3b, the mounting zones 360 and 370 contain apertures 362 and 372 and pockets with glue channels 364 and 374. Each mounting zone, aperture, and pocket with glue channel combination is meant to allow the camera modules 140 to be bonded to the uni-body bracket 352. The apertures 362 and 372 allow the lenses of the camera modules 140 to receive light from objects on the other side of the uni-body bracket 352 after the camera modules 140 are bonded to the uni-body bracket 352. The pockets with glue channels 364 and 374 allow for the camera modules 140 to be bonded to a greater surface area of the uni-body bracket 352 with UV-activated adhesive while allowing any excess UV-activated adhesive to escape from the pocket through the glue channels. In other embodiments, the mounting zones 360 and 370 may not have pockets with glue channels. For example, the mounting zones 360 and 370 may be raised off the surface of the uni-body bracket 352 such that they provide a platform for the multiple camera modules 140, of FIG. 1 to be bonded to the uni-body bracket 352. In other embodiments, one mounting zone may be raised off the surface of uni-body bracket 352 while the other mounting zone is not, and vice versa. Additionally, in other embodiments, one mounting zone may have pockets with glue channels while the other mounting zone does not, and vice versa. Other embodiments may include various combinations of the above. For example, in one embodiment, one mounting zone may be raised and not have a pocket with glue channels while the other mounting zone may not be raised and not have a pocket with glue channels. Further, in the embodiment shown in FIG. 3, the uni-body bracket 352 has attachment points 356 and 358 for elastomerically mounting the multi-camera mounting apparatus 350 to the information handling system 200, of FIG. 2. In an embodiment, non-elastomeric mounting of the multi-camera mounting apparatus 350 may be done.

Figure 4A:
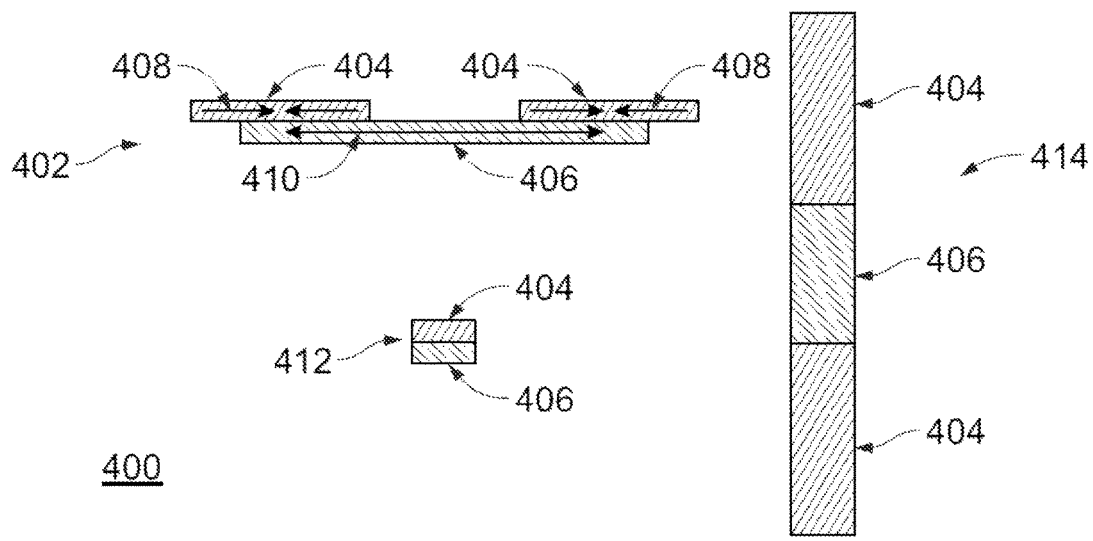
FIG. 4*a* is a schematic diagram of a possible arrangement of the materials of the uni-body bracket of the multi-camera mounting apparatus according to a particular embodiment.

FIG. 4a illustrates an example of a possible arrangement of the plurality of materials 400 of the uni-body bracket 302 of FIG. 3a. A side view of the arrangement is shown in 402. A cross-sectional view of the arrangement is shown in 412. And a top view of the arrangement is shown in 414. As shown in the particular embodiment of FIG. 4a, a first material 404 is placed flat-side facing a second material 406 and the first material 404 may extend beyond the second material 406. The arrangement in the particular embodiment of FIG. 4a is only exemplary, as there can be multiple variations of the interface between the first material 404 and the second material 406, including the interface shown in FIG. 4b and discussed below. For example, the first material 404 may be co-terminal with or shorter than the linear edge of the second material 406. In the particular embodiment of FIG. 4a, the coefficient of thermal expansion of the first material 404 has the opposite sign of the coefficient of thermal expansion of the second material 406. In the embodiment of FIG. 4a, the arrows 408 show the negative thermal expansion of the first material 404 and the arrows 410 show the positive thermal expansion of the second material 406. Thus, the combined thermal expansion of the two materials 404 and 406 is lower than if only the material with the positive coefficient of thermal expansion, in this embodiment the second material 406, is used. Because the combined thermal expansion of the two materials has been reduced, any change in distance between the camera modules 140 (not shown) caused by thermal forces is also reduced. In another embodiment, the first material 404 may have a positive coefficient of thermal expansion and the second material 406 may have a negative coefficient of thermal expansion. In an embodiment, the combined thermal expansion of the first material 404 and the second material 406 is near net-zero. In an embodiment, one of the plurality of materials is aramid. In an embodiment, the absolute value of the coefficient of thermal expansion of the second material 406 is at least 150% of the coefficient of thermal expansion of the first material 404. In an embodiment, the first material 404 is Invar steel and the second material 406 is aramid.

Figure 4B:
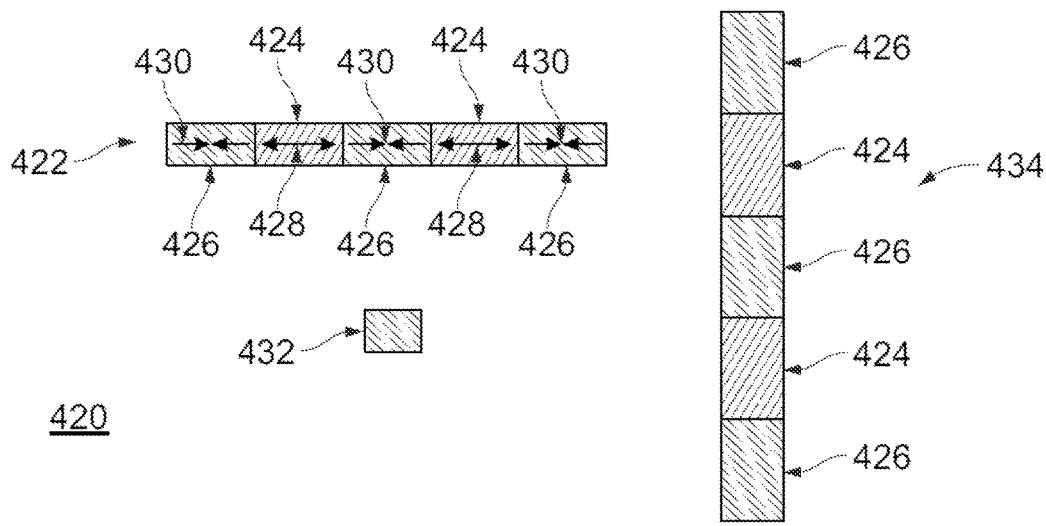
FIG. 4*b* is a schematic diagram of a possible arrangement of the materials of the uni-body bracket of the multi-camera mounting apparatus according to a particular embodiment.

FIG. 4b illustrates an example of another possible arrangement of the plurality of materials 420 of the uni-body bracket 302 of FIG. 3. A side view of the arrangement is shown in 422. A cross-sectional view of the arrangement is shown in 432. And a top view of the arrangement is shown in 434. As shown in the particular embodiment of FIG. 4b, a first material 424 is interspersed between a second material 426. The arrangement in the particular embodiment of FIG. 4a is only exemplary, as there can be multiple variations of the interface between the first material 424 and the second material 426, including the interface shown in FIG. 4a and discussed above. In the particular embodiment of FIG. 4b, the coefficient of thermal expansion of the first material 424 has the opposite sign of the coefficient of thermal expansion of the second material 426. In the embodiment of FIG. 4a, the arrows 430 show the negative thermal expansion of the second material 426 and the arrows 428 show the positive thermal expansion of the first material 424. Thus, the combined thermal expansion of the two materials 424 and 426 is lower than if only the material with the positive coefficient of thermal expansion, in this embodiment the first material 424, is used. Because the combined thermal expansion of the two materials has been reduced, any change in distance between the camera modules 140 (not shown) caused by thermal forces is also reduced. In another embodiment, the first material 404 may have a positive coefficient of thermal expansion and the second material 406 may have a negative coefficient of thermal expansion. In an embodiment, the combined thermal expansion of the first material 424 and the second material 426 is near net-zero. In an embodiment, one of the plurality of materials is aramid. In an embodiment, the absolute value of the coefficient of thermal expansion of the first material 424 is at least 150% of the coefficient of thermal expansion of the second material 426. In an embodiment, the first material 424 is Invar steel and the second material 426 is aramid. As discussed above, other materials with similar coefficients of thermal expansion are contemplated as well.

While the particular embodiments of FIG. 4a and FIG. 4b show the cross-section of the plurality of materials as rectangular, such that the first material and the second material are rectangular rods, the cross-section of the first material 402 or 412 and second material 404 or 414 can be of any shape, including circular such that the first material 402 or 412 and the second material 404 or 414 are straight rods. Further, in an embodiment, the amount, width, length, or thickness of the first material 402 or 412 may not be the same as the amount, width, length, or thickness of the second material 404 or 414, respectively.

Figure 5:
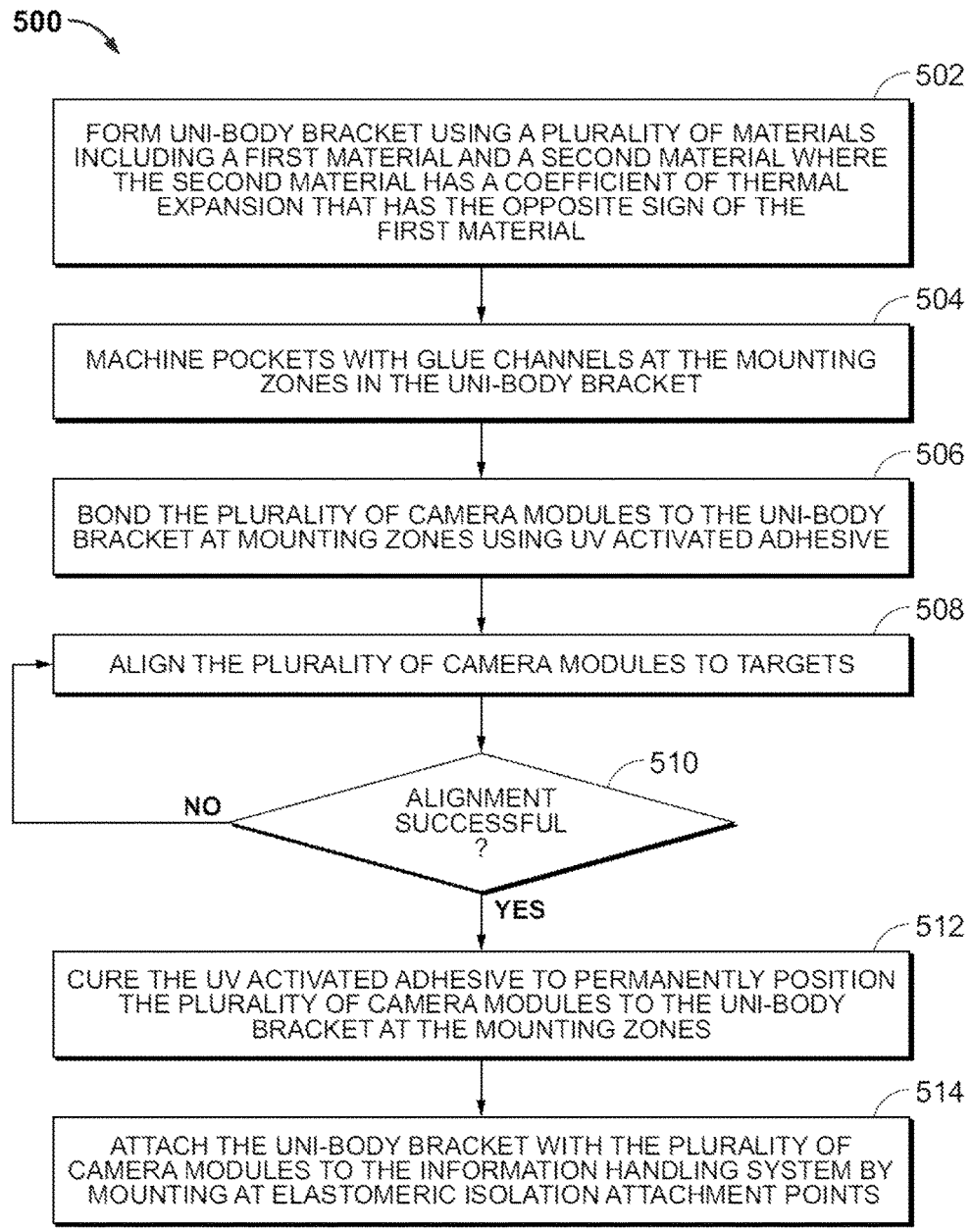
FIG. 5 is a flow diagram of a method for manufacturing a multi-camera mounting apparatus and attaching it to an information handling system according to a particular embodiment.

FIG. 5 shows a flow diagram of a method 500 for manufacturing an information handling system with a multi-camera mounting apparatus. At block 502, the uni-body bracket can be formed using a plurality of materials including a first material and a second material where the second material has a coefficient of thermal expansion that has the opposite sign of the first material. In an embodiment, the combined thermal expansion of the first material and the second material is reduced, including near net-zero. In an embodiment, one of the plurality of materials is aramid. In an embodiment, the absolute value of the coefficient of thermal expansion of the second material is at least 150% of the coefficient of thermal expansion of the first material. In an embodiment, the first material is Invar steel and the second material is aramid. As discussed above, other materials with similar coefficients of thermal expansion are contemplated as well. At block 504, pockets with glue channels can be machined at the mounting zones of the uni-body bracket. Other ways of forming the pockets with channels known in the art may also be used, such as a punch press. At block 506, the plurality of camera modules can be bonded to the uni-body bracket at mounting zones using UV-activated adhesive. At block 508, the plurality of camera modules can be aligned to targets. In an embodiment, this alignment is done for initial calibration of stereo-scopic functions. In an embodiment, the alignment at block 508 can be done as part of a calibration of a multi-camera depth mapping technology. A determination is made, at block 510, whether the alignment of the plurality of camera modules is successful. If the alignment was not successful, then the plurality of camera modules can be re-aligned at block 508. Once the determination is made, at block 510, that the alignment of the plurality of camera modules is successful, then, at block 512, the UV-activated adhesive can be cured to permanently position the plurality of camera modules to the mounting zones of the uni-body bracket. For example, flash-bonding the UV-activated adhesive allows the adhesive to cure quickly and permanently bond the camera modules 140 to the uni-body bracket thus minimizing the likelihood of the camera modules 140 shifting during the curing process after alignment. At block 514, the uni-body bracket with the plurality of camera modules is attached to the information handling system by mounting at elastomeric isolation attachment points. Exemplary materials that may be used for the elastomeric isolation mounting interface are silicone rubber, neoprene rubber, and open-cell foam rubber. Other materials with similar properties may be used as well.

In an embodiment, non-elastomeric mounting of the multi-camera mounting apparatus may be done to attach the multi-camera mounting apparatus to the information handling system.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A multi-camera mounting apparatus comprising:
    a uni-body bracket fixedly attached to an information handling system at a plurality of attachment points;
    the uni-body bracket comprised of a plurality of materials wherein a first material has either a negative or positive coefficient of thermal expansion and a second material has a coefficient of thermal expansion of the opposite sign of the first material;
    the uni-body bracket containing a mounting zone for the mounting of a plurality of camera modules;
    an elastomeric isolation mounting interface operatively coupled to at least one attachment point, wherein affixing the multi-camera mounting apparatus with the plurality of camera modules to the information handling system is accomplished via the elastomeric isolation mounting interface at the attachment point.

2. The multi-camera mounting apparatus of claim 1, wherein the mounting zone includes a pocket with an aperture for a camera.

3. The multi-camera mounting apparatus of claim 1, wherein the mounting zone includes a pocket with glue channels.

4. The multi-camera mounting apparatus of claim 1, wherein the plurality of materials includes aramid.

5. The multi-camera mounting apparatus of claim 1, wherein the plurality of materials of the uni-body bracket are layered flat-side facing.

6. The multi-camera mounting apparatus of claim 5, wherein for each dimension of the uni-body bracket the plurality of materials are arranged such that two pieces of the first material overlap a single piece of the second material.

7. The multi-camera mounting apparatus of claim 1, wherein the second material is interspersed within the first material of the uni-body bracket.

8. The multi-camera mounting apparatus of claim 7, wherein the first material and the second material have a combined near net-zero thermal expansion.

9. A method for manufacturing an information handling system with a multi-camera system comprising:
    affixing a plurality of camera modules to a multi-camera mounting apparatus by bonding with a UV-activated adhesive wherein the multi-camera mounting apparatus comprises a uni-body bracket comprised of a plurality of materials including a first material and a second material wherein the coefficient of thermal expansion of the second material has the opposite sign of the first material; and
    affixing the multi-camera mounting apparatus with the plurality of camera modules to the information handling system via elastomeric isolation mounting at attachment points.

10. The method of claim 9, wherein the first material and the second material have a combined near net-zero thermal expansion.

11. The method of claim 9, wherein affixing the plurality of camera modules to a multi-camera mounting apparatus by bonding with UV-activated adhesive comprises:
    aligning the camera modules to targets; and
    curing the UV-activated adhesive with UV light exposure.

12. The method of claim 9, wherein the uni-body bracket of the multi-camera mounting apparatus contains mounting zones for the mounting of a plurality of camera modules wherein the mounting zones include a pocket having an aperture for a camera and at least one glue channel.

13. The method of claim 9, wherein the plurality of materials of the uni-body bracket of the multi-camera mounting apparatus includes aramid.

14. The method of claim 9, wherein the first and second materials of the uni-body bracket are layered flat-side facing.

15. The method of claim 9, wherein the multi-camera mounting apparatus is comprised of straight rods.

16. An information handling system comprising:
    a display screen to display an image;
    a processor to communicate with the display screen;
    a plurality of camera modules; and
    a multi-camera mounting apparatus comprised of a uni-body bracket comprised of a plurality of materials including a first material and a second material having a combined reduced thermal expansion wherein the coefficient of thermal expansion of the second material has the opposite sign of the first material and wherein the plurality of materials of the uni-body bracket includes aramid and Invar steel.

17. The information handling system of claim 16, wherein the uni-body bracket of the multi-camera mounting apparatus contains mounting zones for the mounting of a plurality of camera modules wherein the mounting zones include a pocket having an aperture for a camera and at least one glue channel.

18. The information handling system of claim 16, wherein the camera modules are affixed to the multi-camera mounting apparatus by bonding with UV-activated adhesive.

19. The information handling system of claim 18, wherein the camera modules were aligned to targets prior to the UV-activated adhesive being cured.

20. The information handling system of claim 16, wherein for each dimension of the uni-body bracket the plurality of materials are arranged such that two pieces of the first material overlap a single piece of the second material.

* * * * *